United States Patent [19]
Lim

[11] Patent Number: 5,953,072
[45] Date of Patent: Sep. 14, 1999

[54] APPARATUS FOR AUTOMATICALLY SWITCHING BROADCASTING SYSTEMS AND A CONTROLLING METHOD THEREOF

[75] Inventor: Ji-Hoon Lim, Kyunggi-Do, Rep. of Korea

[73] Assignee: Daewoo Electronics Co., Ltd., Seoul, Rep. of Korea

[21] Appl. No.: 08/831,306

[22] Filed: Apr. 1, 1997

[30] Foreign Application Priority Data

Nov. 19, 1996 [KR] Rep. of Korea .................. 96-55383

[51] Int. Cl.$^6$ ........................................ H04N 5/46
[52] U.S. Cl. ................. 348/555; 348/557; 348/558; 348/643
[58] Field of Search ............................. 348/555, 556, 348/558, 557, 643, 644, 454, 457; H04N 5/46

[56] References Cited

U.S. PATENT DOCUMENTS 5,784,117  7/1998  Mitarai ........................... 348/558

Primary Examiner—Sherrie Hsia
Attorney, Agent, or Firm—Jacobson, Price, Holman & Stern, PLLC

[57] ABSTRACT

An apparatus for automatically switching broadcasting systems and controlling method thereof controls switching between an NTSC system and a PAL-M system according to the detected number of color killer signals. A stabilized broadcasting system is set to either the NTSC system or the PAL-M system when the broadcasting system is switched between the PAL-M system and the NTSC system by more than the predetermined times in the broadcasting signal receiving system capable of receiving both NTSC broadcasting system and PAL-M broadcasting system to provide a high picture quality images.

11 Claims, 3 Drawing Sheets

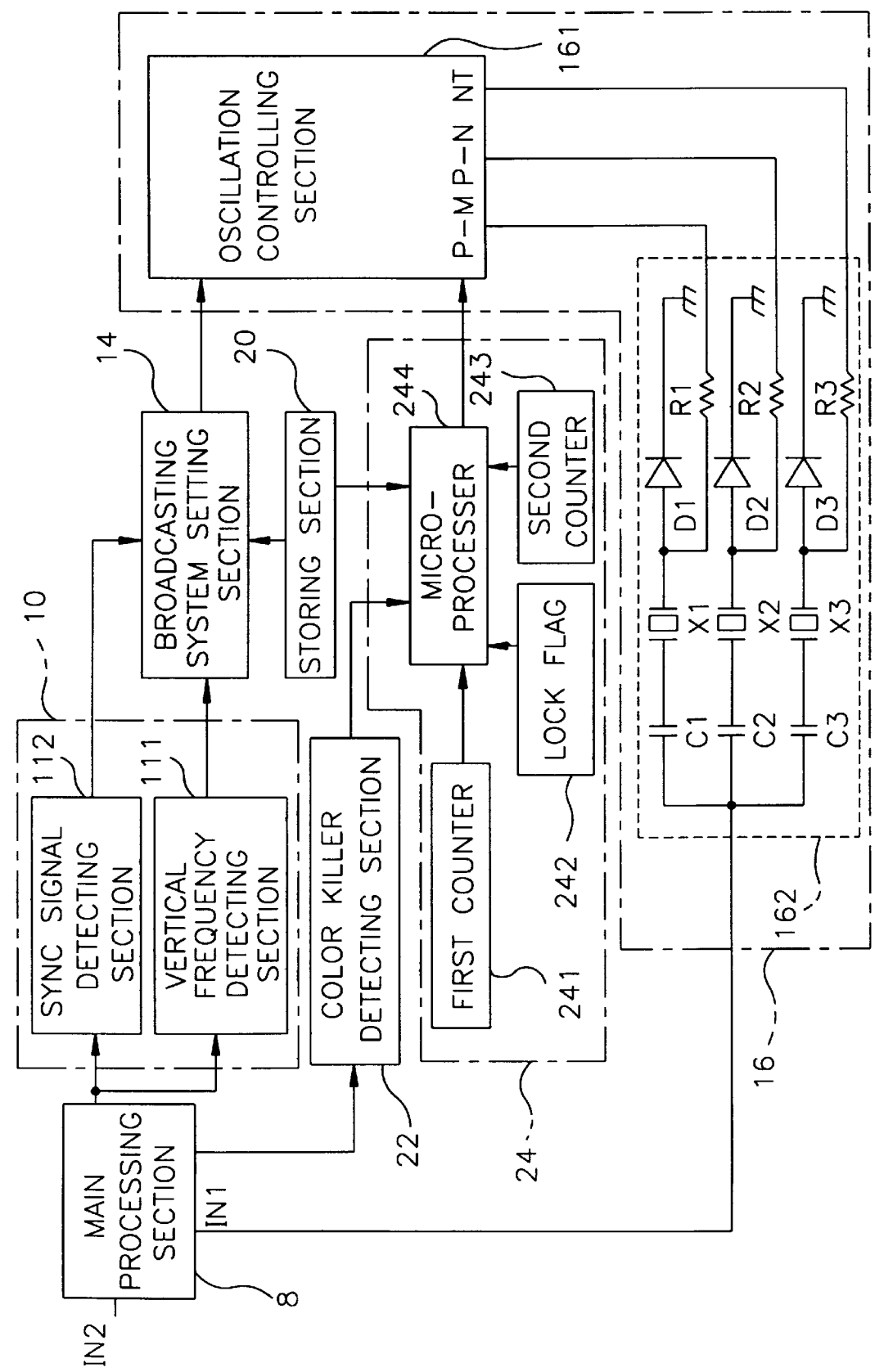

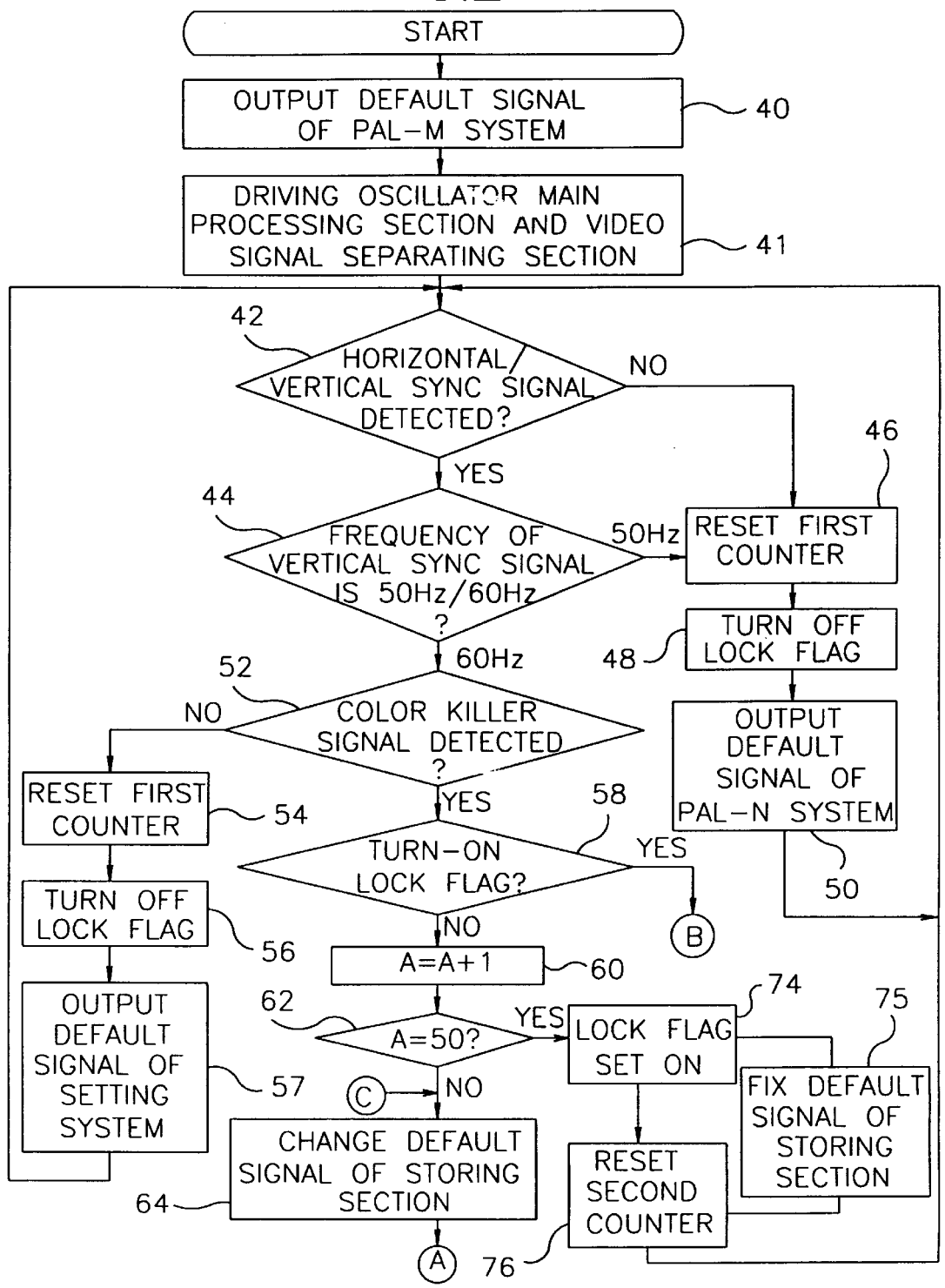

//1//

APPARATUS FOR AUTOMATICALLY SWITCHING BROADCASTING SYSTEMS AND A CONTROLLING METHOD THEREOF

BACKGROUND OF THE INVENTION

1. Field of the Invention

The present invention relates to a broadcasting signal receiving system capable of receiving broadcast signals transmitted in NTSC, PAL-M and PAL-N systems, and more particularly to an apparatus for automatically switching broadcasting systems capable of stabilizing a broadcasting signal receiving system and a controlling method of using the same.

2. Description of the Prior Art

Broadcasting systems of broadcast signals provided from broadcasting stations are generally classified into a SYSTEM M, B/G, D/K, I and L in accordance with the characteristics of transmitted signals, and classified into NTSC (National Television System Committee), PAL (Phase Alternation by Line) and SECAM (Sequential Couleur a Memoire) in accordance with the characteristics of color signals.

Broadcasting stations of respective nations send broadcast signals of combining a TV broadcasting system with a TV color system. For example, NTSC-M system is adopted by the United States, Japan, Korea, etc., and PAL-B/G system is by western European countries such as German, Spain, Italy and Sweden. PAL-D/K system is standard in China, Rumania, etc. England, Island and South Africa Republic adopt PAL-I system, and France and Luxemburg adopt SECAM-L system.

Eastern European countries such as United independence nations adopt PAL-M system (in which the number of scanning lines is 525 H, field frequency is 59.94 Hz and chrominance subcarrier frequency Fsc is 3.575611 MHz), and PAL-N (having 625 H/50 Hz and Fsc of 3.582056 MHz) is standard in Argentina. Therefore, when a user migrates to a region having a different broadcasting system, the broadcasting system of the television should be set again for receiving the broadcast signals of corresponding region.

Among the broadcasting systems of broadcast signals, NTSC system and PAL-M system have the identical vertical sync frequency set to 60 Hz, and PAL-N system has the vertical sync frequency set to 50 Hz. Thus, in a common television, the frequency of the vertical sync signal inserted into the broadcast signal is detected, the broadcasting system is set in accordance with the frequency of the detected vertical sync signal. Then, the chrominance subcarrier is oscillated in accordance with the set broadcasting system, and the broadcast signal is processed in accordance with the oscillated chrominance subcarrier.

For instance, in case that the frequency of the vertical sync signal included in the broadcast signal is 50 Hz, the broadcasting system is of PAL-N system. Therefore, the television oscillates the chrominance subcarrier corresponding to the broadcasting system, and processes the broadcast signal received via an antenna in accordance with the oscillated chrominance subcarrier.

Also, in case that the frequency of the vertical sync signal is 60 Hz, the broadcasting system is set to PAL-M in the television, and the broadcast signal is processed in accordance with the PAL-M system set as above. Once a color killer signal is generated from the processed broadcast signal, the broadcasting system is switched into the NTSC system, and the broadcast signal is processed in accordance with the NTSC system.

//2//

The conventional television in which the PAL-M system is set as a default system mutes a video signal in a region where the NTSC system is applied while the PAL-M system is switching into NTSC system. That is, the received broadcast signal is first processed in view of the PAL-M system. Then, once the color killer signal is generated from the processed broadcast signal, the received broadcast signal is processed in view of the NTSC system. The video signal is muted until the received broadcast signal is processed by the NTSC system. The muting time of the video signal is approximately 200[ms] or so taken from turning on a power switch to displaying the video signal.

Several methods for automatically switching broadcasting systems for shortening the switching time from the PAL-M system to NTSC system have been suggested in recent years. However, when the electric power intensity of the broadcast signal transmitted from a broadcasting station is insignificant or broadcast signals interfere with each other during the transmission, a color burst signal included in the broadcast signal is lost and a color killer signal is detected in the broadcasting signal receiving system, e.g., television, VCR, etc.

In this case, even though the broadcast signal of the system identical to the default system (PAL-M system) is received, the broadcasting signal receiving system, processes the broadcast signal by switching it into the other broadcasting system (NTSC system) that is different from the default system set into the broadcasting signal receiving system.

Furthermore, when broadcast signals of different systems are recorded on a video tape, i.e., in the order of NTSC/PAL-M/monochrome/NTSC/ . . . , the color killer signal is continuously detected while the monochrome broadcast signal is detected, and the broadcasting signal receiving system should repeatedly switch the default system while the color killer signals is detected. Therefore, when the broadcast signal processed in the NTSC system is switched into the PAL-M system to be processed, the tint resulting from a color phase is displayed on a screen in case of processing the broadcast signal in the NTSC system. Also, when the broadcast signal is processed in the PAL-M system, an OSD (alphanumeric signal) flickers since the tint is not displayed. Consequently, a consumer wrongly considers it as a breakdown of the broadcasting signal receiving system. Additionally, the broadcasting signal receiving system under operation is internally unstable to be disadvantageous of shortening durability or degrading performance of the broadcasting signal receiving system.

SUMMARY OF THE INVENTION

Therefore, it is an object of the present invention to provide an apparatus for automatically switching broadcasting systems and controlling method thereof capable of stabilizing a broadcasting signal receiving system by controlling the switching between NTSC system and PAL-M system in accordance with the input number of color killer signal.

To achieve the above object of the present invention, an apparatus for automatically switching broadcasting systems includes a storing section recorded with a first broadcasting system signal as a default signal in an initial value, and a broadcasting system setting section for selecting either one of a second broadcasting system signal generated by horizontal/vertical sync signals and a frequency signal or said default signal of said storing section in accordance with said frequency signal. An oscillating section oscillates by a predetermined frequency in accordance with an output signal of said broadcasting system setting section and a broadcasting system change signal, and a main processing section processes a broadcast signal received via an antenna in accordance with said frequency of said oscillating section. In addition, a video signal separating section detects a sync signal and frequency from a video signal of said main processing section to generate said horizontal/vertical sync signals and frequency signal, and a color killer detecting section detects a color killer signal from said video signal of said main processing section. A broadcasting system changing section switches said default signal of said storing section into either one of said first broadcasting system signal or second broadcast signal in accordance with said color killer signal, fixes said default signal of said storing section in accordance with the input number of said color killer signal, and supplies said switched/fixed default signal into said oscillating section as said broadcasting system change signal.

The video signal from the main processing section is supplied to the sync signal detecting section and vertical frequency detecting section. Then, the sync signal detecting section and vertical frequency detecting section respectively detect whether the vertical/horizontal sync signals are received or not and the frequency of the vertical sync signal is 50 Hz or 60 Hz to provide the frequency signal. Once the color killer signal is detected from the color killer detecting section, the broadcasting system changing section changes the default signal. When the input number of the color killer signal reaches a predetermined value, a specific broadcasting system between the PAL-M system and NTSC system is set as the default signal. Since the broadcast signal is processed in accordance with the settled default signal, the broadcasting signal receiving system can be stabilized.

BRIEF DESCRIPTION OF THE DRAWINGS

The above objects and other advantages of the present invention will become more apparent by describing in detail preferred embodiments thereof with reference to the attached drawings in which:

FIG. 1 is a view showing a construction of an apparatus for automatically switching broadcasting systems according to the present invention; and FIGS. 2A to 2C are views showing a method for controlling the automatic switching of broadcasting systems according to the present invention.

DETAILED DESCRIPTION OF THE PREFERRED EMBODIMENT

Figure 2B:
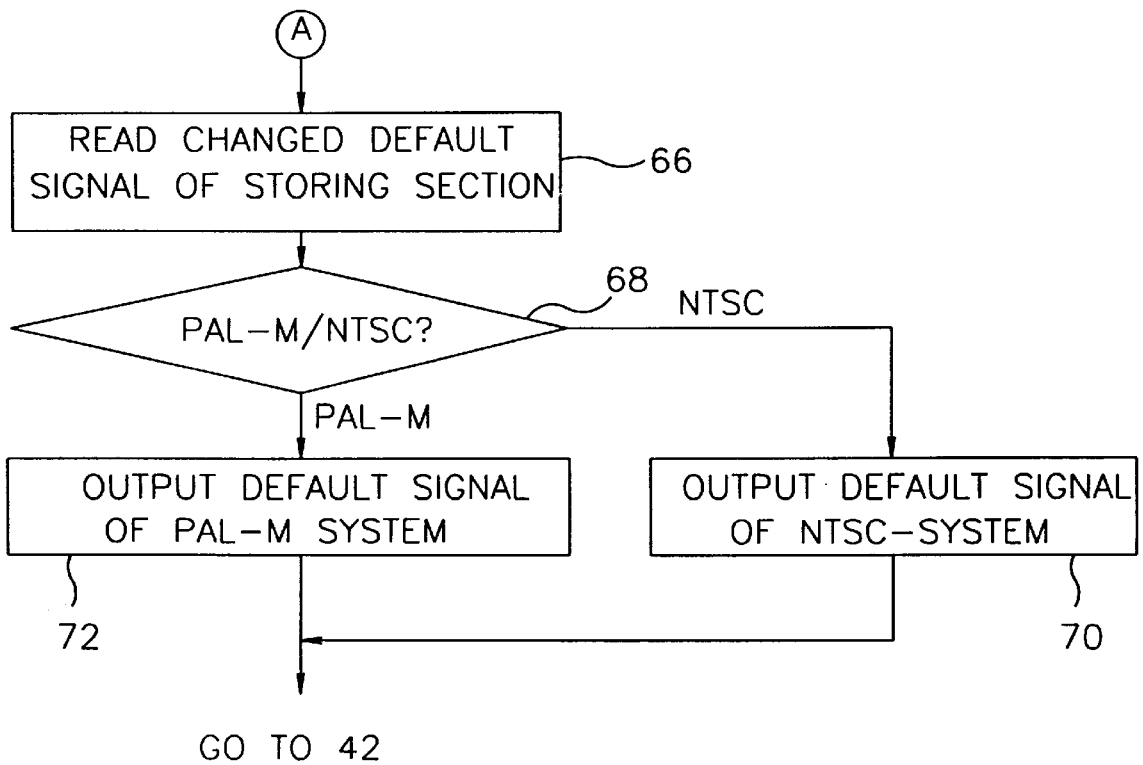

The preferred embodiment of the present invention will be described in detail hereinbelow.

FIG. 1 is a block diagram showing a construction of an apparatus for automatically switching broadcasting systems in a broadcasting signal receiving system according to the present invention. Here, a reference numeral 8 denotes a main processing section for processing a composite video signal IN2 received via an antenna in accordance with an oscillating frequency IN1 to separate a luma signal and a video signal; and 10 is a video signal separating section for detecting the frequency of a vertical sync signal and the existence of a sync signal from the video signal of main processing section 8 to provide a frequency signal and horizontal/vertical sync signals.

At this time, video signal separating section 10 includes a vertical frequency detecting section 111 for detecting the frequency of the vertical sync signal to provide the frequency signal and a sync signal detecting section 112 for detecting the vertical sync signal and horizontal sync signal from the video signal of main processing section 8 to provide the horizontal/vertical sync signals.

A reference numeral 14 denotes a broadcasting system setting section for selecting, in accordance with the kind of the frequency signal, either one of a broadcasting system signal of PAL-N system or a default signal generated in accordance with the horizontal/vertical sync signals and frequency signal.

A reference numeral 16 denotes an oscillating circuit for producing a chrominance subcarrier in accordance with the broadcasting system signal, which includes an oscillation controlling section 161 for providing first, second and third control signals via output ports P-M, P-N and NT and an oscillator 162 for oscillating the chrominance subcarrier in accordance with the first, second and third control signals from oscillation controlling section 161.

Oscillator 162 is provided for oscillating 3.579545[MHz]/3.575611[MHz]/3.582056[MHz] respectively corresponding to NTSC/ PAL-M/ PAL-N systems in accordance with the first to third control signals of oscillation controlling section 161. Oscillator 162 is formed by diodes D1, D2 and D3 having anodes respectively connected to output ports P-M, P-N and NT of oscillation controlling section 161 for switching in an on-state in accordance with the potential levels of the first, second and third control signals passed resistors R1, R2, and R3 which are connected to the output ports P-M, P-N, and NT, and crystal resonators X1, X2 and X3 and capacitors C1, C2 and C3 respectively connected in serial for oscillating by predetermined frequencies when diodes D1, D2 and D3 are switched in the on-state.

A reference numeral 20 denotes a storing section for storing the default signal; 22 is a color killer detecting section for detecting a color killer signal from the video signal of main processing section 8; and 24 is a broadcasting system changing section which switches the default signal stored in storing section 20 to provide the switched default signal into a broadcasting system change signal in accordance with the input of the color killer signal, and generates fourth, fifth and sixth control signals for controlling the switching of the default signal in accordance with the input number of color killer signal.

Here, broadcasting system changing section 24 is formed by a first counter 241 operated in accordance with the fourth control signal for counting the switching number of the default system, a lock flag 242 triggered in accordance with the fifth control signal for locking the switching of the default system, and a second counter 243 operated in accordance with the sixth control signal for releasing the locking status of the default signal. In addition to these, a microprocessor 244 for switching the default signal of storing section 20 in accordance with the input status of the output signals of first counter 241, lock flag 242 and second counter 243 and the color killer signal to provide the broadcasting system change signal is furnished thereto.

Figure 2C:
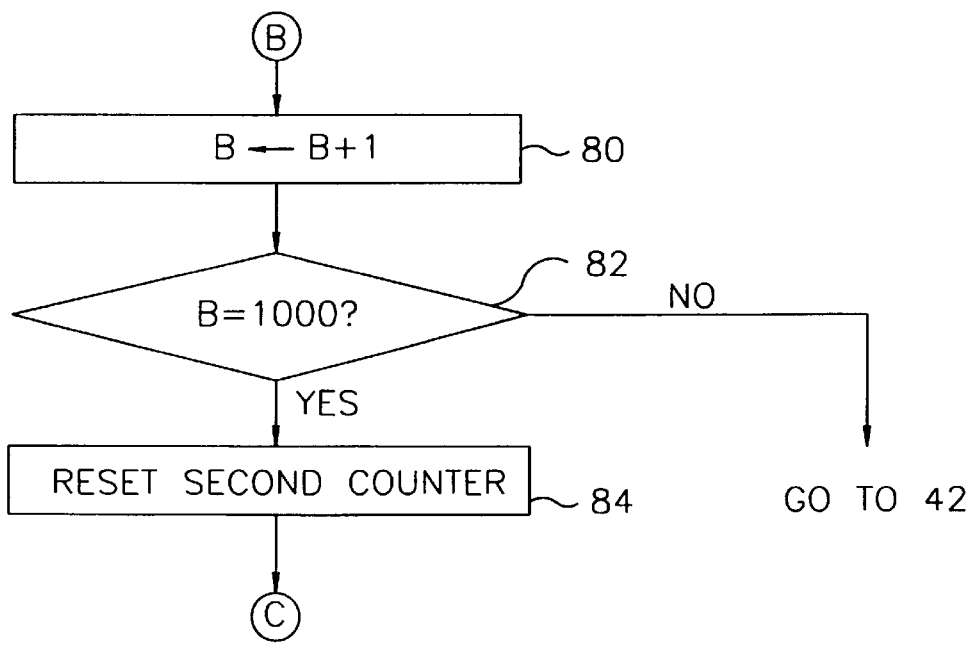

FIGS. 2A to 2C are views showing a method for automatically switching the broadcasting systems in the broadcasting signal receiving system according to the present invention. Referring to FIGS. 2A to 2C, the automatic broadcasting system switching method according to the present invention will be described.

To begin with, storing section 20 is stored with the default signal in the PAL-M system, and the default signal of PAL-M system is supplied to broadcasting system setting section 14 which in turn buffers the default signal to provide it to oscillation controlling section 161 (step 40).

Oscillation controlling section 161 provides the second control signal of high level via output port P-M, and the second control signal is supplied to diode D2 of oscillator 162. Then, diode D2 is switched in the turn-on state to allow one end thereof to be grounded.

By this operation, crystal resonator X2 is oscillated, and the oscillating frequency of crystal resonator X2 is supplied to capacitor C2 which is then resonated to provide resonance signal IN1. At this time, the frequency of resonance signal IN1 is 3.575611[MHz] which is the oscillating frequency of PAL-M system.

Resonance signal IN1 is supplied to main processing section 8 which processes the broadcast signal received via a channel selected via a tuner (not shown) in accordance with the frequency of oscillation signal IN1 to separate the luma signal and video signal (step 41).

The video signal is supplied to both vertical frequency detecting section 111 and sync signal detecting section 112. Thus, vertical frequency detecting section 111 detects the frequency of the vertical sync signal from the video signal to provide the frequency signal, and sync signal detecting section 112 detects whether the horizontal and vertical sync signals exist or not to provide the horizontal/vertical sync signals. The horizontal/vertical sync signals and frequency signal are supplied to broadcasting system setting section 14.

Broadcasting system setting section 14 judges whether the horizontal/vertical sync signals are detected or not (step 42). If the horizontal/vertical sync signals are detected, it is checked whether the frequency of the vertical sync signal is 50 Hz or 60 Hz from the frequency signal (step 44).

When it is judged that there are no horizontal/vertical sync signals in steps 42 and 44 or the horizontal/vertical sync signals and frequency signal of 50 Hz are received, broadcasting system setting section 14 provides the broadcasting system signal of PAL-N broadcasting system. Then, the broadcasting system signal of PAL-N broadcasting system is stored in storing section 20 (step 50).

The broadcasting system signal of PAL-N broadcasting system is supplied to oscillation controlling section 161 (step 50) in which the first control signal for oscillating the chrominance subcarrier corresponding to the PAL-M broadcasting system is provided via output port P-N.

The first control signal is supplied to diode D1 which is switched in the on-state to ground one end of crystal resonator X1. After this, crystal resonator X1 is oscillated and provides the oscillating frequency which is 3.582056 [MHz]. The oscillating frequency is supplied to resonate capacitor C1, and the resonance signal is supplied to main processing section 8. Then, main processing section 8 processes the broadcast signal of the television in accordance with the oscillating frequency of the resonance signal, and the program proceeds to step 42.

Also, microprocessor 244 of broadcasting system changing section 24 provide the fourth control signal of low level, the fourth control signal of low level is supplied to first counter 241, and first counter 241 clears counting number A into zero (step 46). After executing step 46, microprocessor 244 provides the fifth control signal of low level, and the fifth control of low level is supplied to lock flag 242 which in turn sets the flag into the off state (step 48).

On the other hand, if it is judged that the frequency of the vertical sync signal is 60 Hz in broadcasting system setting section 14 (step 44), microprocessor 244 judges whether the color killer signal is detected or not (step 52). If the color killer signal is not detected, the fourth control signal of low level is provided to reset the counting number A of first counter 241 (step 54). After executing step 54, microprocessor 244 provides the fifth control signal of low level to set the flag signal of lock flag 242 into the off state (step 56). Thus, the default signal stored in storing section 20 is supplied to oscillating circuit 16 which then oscillates the chrominance subcarrier signal corresponding to the default signal (step 57). After performing step 57, the program goes to step 42.

However, if the color killer signal is detected in step 52, it is judged whether lock flag 242 is set to the on state (step 58). When it is judged that lock flag 242 is not set to the on state in step 58, counting number A of first counter 241 is augmented by as many as one (step 60) to judge whether counting number A of step 60 is the same as a predetermined value, e.g., 50 (step 62). When it is judged that counting value A is not the same as the predetermined value in step 62, the program proceeds to step 64.

In step 64, when the default signal stored in storing section 20 is of the broadcasting system signal of the PAL-M, it is changed into the default signal of NTSC system. Then, the changed default signal of NTSC system is stored in storing section 20.

Meantime, if the default signal storing in storing section 20 is of the NTSC system, it is switched into of the PAL-M system. Then, the default signal of PAL-M system is stored in storing section 20. Also, microprocessor 244 read out the default signal stored in storing section 20 (step 66), judges whether the default signal is of the NTSC or PAL-M system (step 68), and proceeds to step 70 when it is the default signal of NTSC system in step 68.

In step 70, the default signal of NTSC system is supplied to oscillation controlling section 161 which provides the third control signal of high level via output port NT. The control signal of high level is supplied to diode D3 of oscillator 162, and diode D3 is turned on to ground one end of crystal resonator X3 which is then oscillated. The oscillating frequency thereof is 3.579545[MHz].

The oscillating frequency is supplied to capacitor C3 which then resonates in accordance with the oscillating frequency to provide the resonance signal. The resonance signal is supplied to main processing section 8 which in turn processes the broadcast signal of the corresponding television upon the resonance signal.

However, if the default signal stored in storing section 20 is of PAL-M system, the default signal of PAL-N system is supplied to oscillation controlling section 161 (step 72), and oscillation controlling section 161 oscillates the chrominance subcarrier for processing the broadcast signal of PAL-M system. Here, the procedure of oscillating the chrominance subcarrier is the same as foregoing description.

Meantime, in step 62, when counting value A of first counter 241 is the same as the predetermined value, lock flag 242 is set to the on state to return to the initial state (step 74). Also, the switching of the default signal stored in storing section 20 is stopped (step 75), and second counter 243 is reset (step 76). After performing step 76, the program goes to step 42.

If it is judged that lock flag 242 is turned on in step 58, second counter 243 is augmented by as many as one (step 80), and it is judged whether counting value B of second counter 243 is the same as a predetermined value, e.g., 1000, or not (step 82).

If counting value B of second counter 243 is not the same as the predetermined value, i.e., 1000, in step 82, the program goes to step 42. But, in step 82, counting value B of second counter 243 is the same as the predetermined value, second counter 243 is reset step 84 to proceed to step 64.

That is, when counting value A of first counter 241 reaches the predetermined value, lock flag 242 is turned on (step 74), and the switching of the broadcasting system stored in storing section 20 is stopped even through the color killer signal is received (step 75). Then, second counter 243 is reset. Also, second counter 243 counts the color killer signals received after turning on lock flag 242, turns off lock flag 242 and switches the broadcasting system stored in storing section 20 when counting value B reaches the predetermined value.

Therefore, when the PAL-M system and NTSC system having the same frequency of the vertical sync signal, i.e., 60 Hz, are switched more than predetermined times, lock flag 242 is turned on to set the default signal into a specific broadcasting system either one of PAL-M system and NTSC system. By doing so, the broadcasting signal receiving system is stabilized, and the broadcasting system is fixed to enable to change corresponding default system into the other default system, thereby making it possible to appropriately switching the broadcasting systems between the monochrome broadcasting and color broadcasting of PAL-M system/ PAL-N system/ NTSC system.

By apparatus for automatically switching broadcasting systems and controlling method thereof according to one embodiment of the present invention as described above, the broadcasting system is set to either one of the NTSC system or PAL-M system when the broadcasting system is switched between the PAL-M system and NTSC system by more than the predetermined times in the broadcasting signal receiving system capable of receiving both NTSC broadcasting system and PAL-M broadcasting system, so that the broadcasting receiving system is stabilized and images of high picture quality can be provided.

While the present invention has been particularly shown and described with reference to particular embodiment thereof, it will be understood by those skilled in the art that various changes in form and details may be effected therein. That is, the monitor has been taken as one example in the preferred embodiment of the present invention, but it may be applied to all video signal processing systems such as a general television.

What is claimed is:

1. An apparatus for automatically switching broadcasting systems comprising:

storing means recorded with a first broadcasting system signal as a default signal in an initial value;

broadcasting system setting means for selecting either one of a second broadcasting system signal generated by horizontal/vertical sync signals and a frequency signal or said default signal of said storing means in accordance with said frequency signal;

oscillating means for oscillating by a predetermined frequency in accordance with an output signal of said broadcasting system setting means and a broadcasting system change signal;

main processing means for processing a broadcast signal received via an antenna in accordance with said frequency of said oscillating means;

video signal separating means for detecting a sync signal and frequency from a video signal of said main processing means to generate said horizontal/vertical sync signals and frequency signal;

color killer detecting means for detecting a color killer signal from said video signal of said main processing means; and broadcasting system changing means for switching said default signal of said storing means into either one of said first broadcasting system signal or second broadcast signal in accordance with said color killer signal, fixing said default signal of said storing means in accordance with the input number of said color killer signal, and supplying said switched/fixed default signal into said oscillating means as said broadcasting system change signal.

2. The apparatus for automatically switching broadcasting systems as claimed in claim 1, wherein said broadcasting system changing means comprises:

a first counter for counting the input number of said color killer signal;

a lock flag for displaying the fixing of said default signal of said storing means when the counting value of said first counter is the same as a predetermined value;

a second counter for counting the input number of said color killer signal when said lock flag is turned on; and a microprocessor for switching said default signal of said storing means in accordance with the input of said color killer signal, and controlling the switching/fixing of said default signal of said storing means in accordance with the counting values of said first counter and second counter and the on/off state of said lock flag.

3. The apparatus for automatically switching broadcasting systems as claimed in claim 2, wherein said microprocessor fixes said default signal and turns on said lock flag when said counting value of said first counter reaches said predetermined value, and switches said default signal when said counting value of said second counter reaches said predetermined value and lock flag is in on state.

4. The apparatus for automatically switching broadcasting systems as claimed in claim 1, wherein said oscillating means comprises:

an oscillation controlling section for generating a plurality of control signals for producing a chrominance subcarrier in accordance with said second broadcasting system signal and broadcasting system change signal from said broadcasting system setting means; and an oscillator oscillated in accordance with said plurality of control signals for supplying an oscillating frequency to said main processing means.

5. The apparatus for automatically switching broadcasting systems as claimed in claim 4, wherein said plurality of control signals number three for respectively oscillating said chrominance subcarrier of first control signal, second control signal, and third control signal.

6. The apparatus for automatically switching broadcasting systems as claimed in claim 1, wherein said first broadcasting system signal is of PAL-M system, said second broadcasting system signal is of PAL-N system and a third broadcasting system signal is of NTSC system.

7. An apparatus for automatically switching broadcasting systems comprising:

storing means recorded with a first broadcasting system signal as a default signal in an initial value;

broadcasting system setting means for selecting either one of a second broadcasting system signal generated by horizontal/vertical sync signals and a frequency signal or said default signal of said storing means in accordance with said frequency signal;

oscillating means for oscillating by a predetermined frequency in accordance with an output signal of said broadcasting system setting means and a broadcasting system change signal;

main processing means for processing a broadcast signal received via an antenna in accordance with said frequency of said oscillating means;

video signal separating means for detecting a sync signal and frequency from a video signal of said main processing means to generate said horizontal/vertical sync signals and frequency signal;

color killer detecting means for detecting a color killer signal from said video signal of said main processing means;

a first counter for counting the input number of said color killer signal;

a lock flag for displaying the fixing of said default signal of said storing means when the counting value of said first counter is the same as a predetermined value;

a second counter for counting the input number of said color killer signal when said lock flag is turned on; and a microprocessor for switching said default signal of said storing means in accordance with the input of said color killer signal, and controlling the switching/fixing of said default signal of said storing means in accordance with the counting values of said first counter and second counter and the on/off state of said lock flag.

8. A method for controlling automatically switching of broadcasting systems comprising:

a first step of providing a first broadcasting system signal as a default signal, oscillating chrominance subcarrier corresponding to said first broadcasting system signal, and separating a broadcast signal received via an antenna into a video signal and a luma signal in accordance with said oscillated chrominance subcarrier;

a second step of detecting a sync signal and a frequency from said video signal to provide a horizontal/vertical sync signals and a frequency signal;

a third step of generating a second broadcasting system signal when said horizontal/vertical sync signals are not provided in said second step or said horizontal/vertical sync signals and a predetermined first frequency signal are received, and oscillating said chrominance subcarrier corresponding to said second broadcasting system signal to process said broadcast signal in accordance with said oscillated chrominance subcarrier; and a fourth step of judging whether a color killer signal is received or not when a predetermined second frequency signal is received to switch said default signal of said first step, and fixing said default signal when the input number of said color killer signal reaches a predetermined value.

9. The method for controlling automatically switching of broadcasting systems as claimed in claim 8, wherein said fourth step comprises the steps;

checking whether said color killer signal is received;

checking whether a lock flag is in on state when it is judged that said color killer signal is received;

augmenting the input number of said color killer signal when said lock flag is off state, and judging whether the input number of said color killer signal is the same as the predetermined value;

changing said default signal when said input number of said color killer signal is smaller than said predetermined value in said augmenting step;

oscillating said chrominance subcarrier corresponding to said default signal in accordance with said default signal changed in said changing step, and processing said broadcast signal received via an antenna in accordance with said oscillated chrominance subcarrier;

when said input number of said color killer signal is of said predetermined value in said augumenting step, turning on said lock flag, fixing said default signal, counting the input number of said color killer signal, oscillating said chrominance subcarrier corresponding to said fixed default signal and processing said broadcast signal received via said antenna in accordance with said oscillated chrominance subcarrier;

counting the input number of said color killer signal when said lock flag is on, judging whether the input number of said color killer signal reaches said predetermined value or not and, upon reaching said predetermined value, switching said default signal, oscillating said chrominance subcarrier corresponding to said switched default signal and processing said broadcast signal received via said antenna in accordance with said oscillated chrominance subcarrier; and turning off said lock flag, oscillating said chrominance subcarrier corresponding to said default signal and processing said broadcast signal received via said antenna in accordance with said oscillated chrominance subcarrier, when said color killer signal is not received.

10. The method for controlling automatically switching of broadcasting systems as claimed in claim 8, wherein said predetermined first frequency signal is 50 Hz, and said predetermined second frequency signal is 60 Hz.

11. The method for controlling automatically switching of broadcasting systems as claimed in claim 8, wherein said fourth step is performed by switching said default signal into a third broadcasting system signal when said default signal is of said first broadcasting system signal, and switching said default signal into said first broadcasting system signal when said default signal is of said third broadcasting system signal.

* * * * *